US012089129B2

(12) United States Patent
Thiebaut et al.

(10) Patent No.: US 12,089,129 B2
(45) Date of Patent: Sep. 10, 2024

(54) SUPPORT OF EMERGENCY SERVICES OVER WLAN ACCESS TO 3GPP PACKET CORE FOR UNAUTHENTICATED USERS

(71) Applicant: Alcatel Lucent, Nozay (FR)

(72) Inventors: Laurent Thiebaut, Nozay (FR); Bruno Landais, Lannion (FR); Nicolas Drevon, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/773,432

(22) PCT Filed: Nov. 3, 2016

(86) PCT No.: PCT/EP2016/076588
§ 371 (c)(1),
(2) Date: May 3, 2018

(87) PCT Pub. No.: WO2017/076986
PCT Pub. Date: May 11, 2017

(65) Prior Publication Data
US 2018/0332457 A1 Nov. 15, 2018

(30) Foreign Application Priority Data
Nov. 5, 2015 (EP) .................... 15306757

(51) Int. Cl.
*H04W 4/90* (2018.01)
*H04L 9/40* (2022.01)
(Continued)

(52) U.S. Cl.
CPC .......... *H04W 4/90* (2018.02); *H04L 63/0876* (2013.01); *H04L 63/0892* (2013.01);
(Continued)

(58) Field of Classification Search
CPC ............... H04W 4/90; H04W 12/0401; H04W 36/0022; H04W 12/06; H04W 12/08;
(Continued)

(56) References Cited

U.S. PATENT DOCUMENTS

2010/0030306 A1    2/2010  Edelman et al.
2010/0255808 A1*  10/2010  Guo ........................ H04W 4/90
                                                                        455/404.1

(Continued)

FOREIGN PATENT DOCUMENTS

| EP | 2258126 A1 | 12/2010 |
| WO | WO-2007016695 A2 | 2/2007 |
| WO | WO-2007072176 A1 | 6/2007 |

OTHER PUBLICATIONS

Notification of Transmittal of the International Search Report and the Written Opinion of the International Searching Authority, or the Declaration for PCT/EP2016/076588, PCT/ISA/220 Dated Jan. 12, 2017.

(Continued)

*Primary Examiner* — Wayne H Cai
(74) *Attorney, Agent, or Firm* — Harness, Dickey & Pierce, P.L.C.

(57) ABSTRACT

In an embodiment, a method for support of emergency services over WLAN access to 3GPP Evolved Packet Core EPC for unauthenticated Users includes, in response to a request to provide a user identity for access authentication, a User Equipment UE providing a specific NAI-based user identity having a realm part indicating unauthenticated access for emergency services. Also includes an authenticator, such as TWAN entity for Trusted WLAN access or ePDG for Untrusted WLAN access, routing a message from said UE, based on said realm part, towards a specific 3GPP AAA Server serving a domain dedicated to unauthenticated access for emergency services, the specific 3GPP AAA
(Continued)

Figure 1:
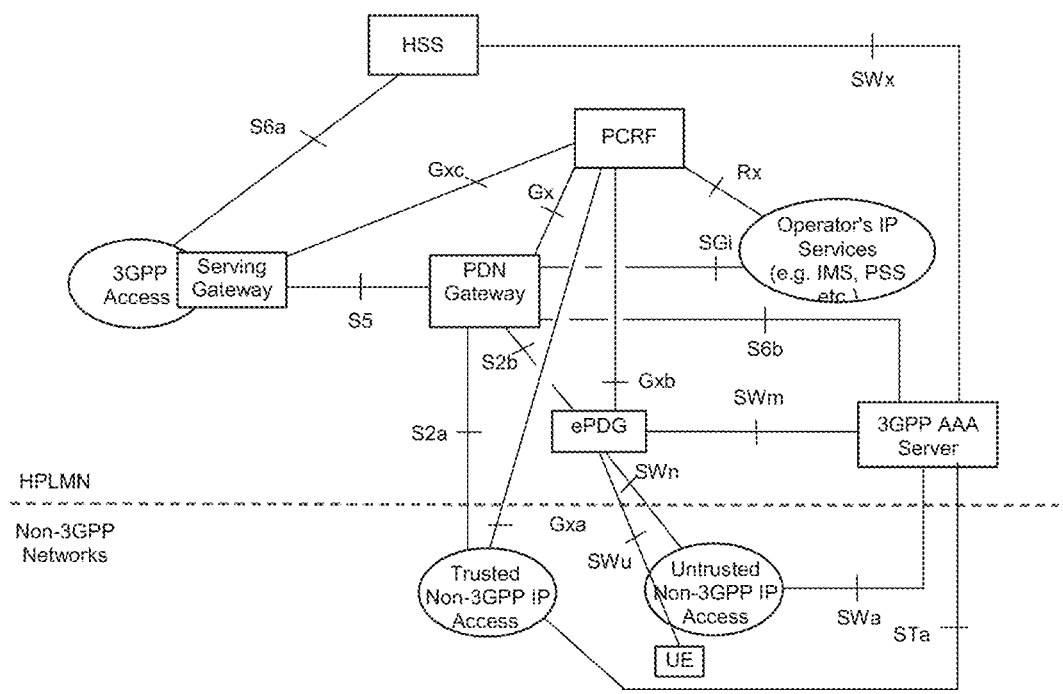

Server granting access to the UE, and providing specific authorization data that allow network access for emergency services to the UE.

18 Claims, 2 Drawing Sheets

(51) Int. Cl.
| | |
|---|---|
| *H04W 12/041* | (2021.01) |
| *H04W 12/06* | (2021.01) |
| *H04W 12/08* | (2021.01) |
| *H04W 36/00* | (2009.01) |

(52) U.S. Cl.
CPC ......... *H04L 63/162* (2013.01); *H04W 12/041* (2021.01); *H04W 12/06* (2013.01); *H04W 12/08* (2013.01); *H04W 36/0022* (2013.01)

(58) Field of Classification Search
CPC ........................... H04W 12/041; H04W 12/04; H04L 63/0876; H04L 63/0892; H04L 63/162
See application file for complete search history.

(56) References Cited

U.S. PATENT DOCUMENTS

| | | | |
|---|---|---|---|
| 2010/0303064 | A1 | 12/2010 | Bari |
| 2016/0183313 | A1* | 6/2016 | Vallabhu ............... H04W 76/12 370/329 |
| 2016/0212667 | A1* | 7/2016 | Kim ...................... H04W 40/36 |
| 2016/0227443 | A1* | 8/2016 | Tomici .................. H04W 28/24 |
| 2016/0261596 | A1* | 9/2016 | Khello ................ H04L 63/0892 |
| 2016/0295386 | A1* | 10/2016 | Faccin .................. H04W 4/023 |
| 2017/0006514 | A1* | 1/2017 | Kiss ...................... H04W 60/06 |

OTHER PUBLICATIONS

International Search Report for PCT/EP2016/076588, PCT/ISA/210 Dated Jan. 12, 2017.
Written Opinion of the International Searching Authority for PCT/EP2016/076588, PCT/ISA/237 Dated Jan. 12, 2017.
Notification of the Recording of a Change for PCT/EP2016/076588, PCT/IB/306 Dated Dec. 14, 2017.
Notification Concerning Submission, Obtention or Transmittal of Priority Document for PCT/EP2016/076588, PCT/IB/304 Dated Nov. 18, 2016.
Requisition by the Examiner and Examination Search Report for corresponding Canadian Application No. 3,004,359 dated Feb. 25, 2019.
Notice of Preliminary Rejection for corresponding Korean Application No. 2018-7012772 dated Feb. 25, 2019.
Office Action for corresponding Japanese Application No. 2018-541545 dated Mar. 26, 2019.
Examination Report for corresponding Indonesian Application No. PID201803319 dated Sep. 19, 2019.
Notice of Final Rejection dated Dec. 30, 2019 issued in corresponding Korean Application No. 10-2018-7012772.
Korean Office Action dated Apr. 16, 2020 issued in corresponding Korean Application No. 10-2018-7012772.
European Office Action dated Mar. 20, 2020 issued in corresponding European Patent Application No. 15306757.4.
Canadian Office Action dated Feb. 7, 2020 issued in corresponding Canadian Application No. 3,004,359.
Indian Office Action dated Jun. 30, 2020 issued in corresponding Indian Application No. 201817016950.
Chinese Office Action dated Jul. 24, 2020 issued in corresponding Chinese Appln. No. 201680077993.X.
Canadian Office Action dated Dec. 10, 2020 issued in corresponding Canadian Application No. 3,004,359.
Brazilian Office Action dated Aug. 24, 2020 issued in corresponding Brazilian Appln. No. BR1120180091537.
European Office Action dated Feb. 3, 2021 issued in corresponding European Appln. No. 15306757.4.
"Support of IMEI signalling for trusted WLAN access." 3GPP TSG-CT WG1 Meeting #93, Vancouver, Canada, Aug. 17-21, 2015.
Canadian Office Action dated Oct. 19, 2021 issued in corresponding Canadian Application No. 3,004,359.
Office Action dated Mar. 17, 2022 issued in corresponding European patent application No. 15306757.4.
Canadian Office Action dated Sep. 12, 2022 issued in corresponding Canadian Application No. 3,004,359.
Office Action for Brazilian Application No. BR112018009153-7 dated Sep. 22, 2023.
Canadian Office Action dated Jul. 17, 2023 issued in corresponding Canadian Application No. 3,004,359.
European Communication under Rule 71(3) EPC dated Feb. 29, 2024 issued in corresponding European Appln. No. 15306757.4.
Office Action for European Application No. 15 306 757.4 dated Jul. 12, 2024.

\* cited by examiner

SUPPORT OF EMERGENCY SERVICES OVER WLAN ACCESS TO 3GPP PACKET CORE FOR UNAUTHENTICATED USERS

CROSS-REFERENCE TO RELATED APPLICATIONS

This is a national phase under 35 U.S.C. § 120 to, PCT International Application No. PCT/EP2016/076588, which has an international filing date of Nov. 3, 2016 which claims priority to European Application No. 15306757.4, filed Nov. 5, 2015 the entire contents of which are hereby incorporated by reference.

The present invention generally relates to mobile communication networks and systems.

Descriptions of mobile networks and systems can be found in the literature, such as in particular in Technical Specifications published by standardization bodies such as for example 3GPP ($3^{rd}$ Generation Partnership Project).

An example of 3GPP mobile system is EPS (Evolved Packet System). An EPS network comprises a Core Network called EPC (Evolved Packet Core) that can be accessed by 3GPP access (such as E-UTRAN) or by Trusted or Untrusted non-3GPP access (such as Trusted or Untrusted WLAN). 3GPP access to EPC is specified in particular in 3GPP TS 23.401 for E-UTRAN access. Non-3GPP access to EPC is specified in particular in 3GPP TS 23.402. An example of architecture for 3GPP and Non 3GPP (Trusted and Untrusted) access to EPC is recalled in FIG. 1 taken from 3GPP TS 23.402.

In a system such as EPS for example, a UE may connect to various external networks (referred to as Packet Data Network PDN, an example being an operator's IMS network), via EPC providing connectivity (referred to as PDN connectivity) services. Authentication is generally performed before granting access and providing connectivity services. However, certain services such as emergency services may also need to be supported for unauthenticated User Equipments. In this document, unauthenticated User Equipment is meant to design a User Equipment without an authenticated user identity, e.g. no user identity is provided to the network (e.g. User Equipment that does not contain a USIM) or the user identity (e.g. IMSI) is not authenticated by the network.

There is a need to improve the support of emergency services in such systems. In particular, emergency services are currently not supported over Trusted or Untrusted WLAN access to 3GPP EPC for unauthenticated User Equipments; there is a need to provide for such support.

Embodiments of the present invention in particular address such needs.

These and other objects are achieved, in one aspect, by a User Equipment UE configured to, for support of emergency services over WLAN access to 3GPP Evolved Packet Core EPC for unauthenticated User Equipments:
  in response to a request to provide a user identity for access authentication, provide a specific NAI-based (Network Access Identity) user identity having a realm part indicating unauthenticated access for emergency services.

These and other objects are achieved, in another aspect, by an authenticator, such as TWAN entity for Trusted WLAN access to EPC or ePDG for Untrusted WLAN access to EPC, configured to, for support of emergency services over WLAN access to 3GPP Evolved Packet Core EPC for unauthenticated User Equipments:
  route a message from a User Equipment UE, based on a realm part of an NAI-based (Network Access Identity) user identity indicating unauthenticated access for emergency services, towards a specific 3GPP AAA Server serving a domain dedicated to unauthenticated access for emergency services.

These and other objects are achieved, in another aspect, by an 3GPP AAA Server, configured to, for support of emergency services over WLAN access to 3GPP Evolved Packet Core EPC for unauthenticated User Equipments:
  serve a domain dedicated to unauthenticated access for emergency services,
  grant access to unauthenticated User Equipment UEs,
  provide specific authorization data that allow network access for emergency services to said UEs.

These and other objects are achieved, in another aspect, by an 3GPP AAA Proxy configured to, for support of emergency services over WLAN access to 3GPP Evolved Packet Core EPC for unauthenticated User Equipments:
  upon detection that it is impossible to contact a 3GPP AAA server in HPLMN for an access authentication attempt associated with an emergency situation for a User Equipment, based on local policies redirect an access authentication request to a local AAA server serving a domain dedicated to unauthenticated access for emergency services.

These and other objects are achieved, in other aspects, by various methods comprising steps performed at one or more of various entities such as above-mentioned User Equipment, authenticator, 3GPP AAA Server, 3GPP AAA Proxy.

Figure 2:
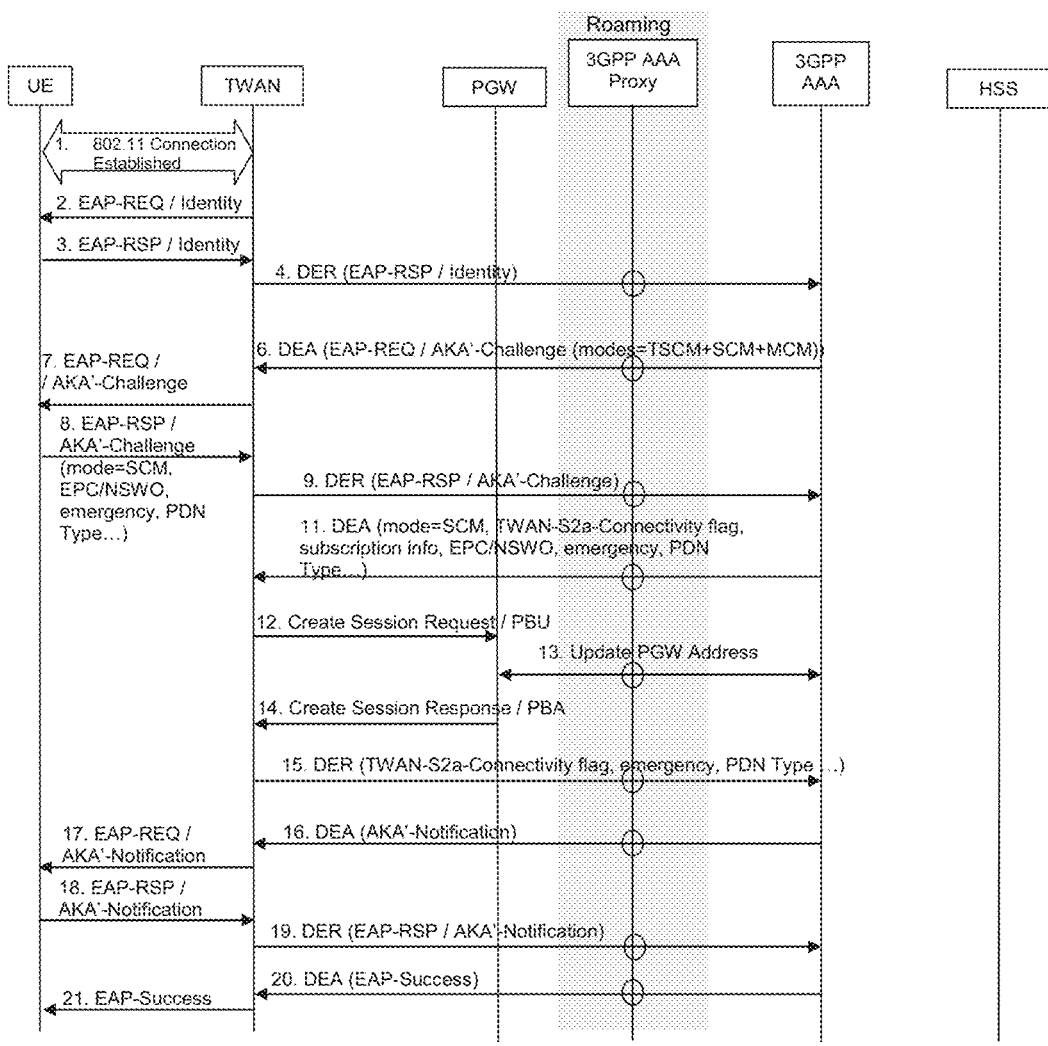

Some embodiments of apparatus and/or methods in accordance with embodiments of the present invention are now described, by way of example only, and with reference to the accompanying drawings, in which:

FIG. 1 is intended to recall an example of architecture for 3GPP and Non 3GPP (Trusted or Untrusted) access to EPC, FIG. 2 is intended to illustrate an example of signaling flow according to embodiments of the invention.

| Abbreviations | |
|---|---|
| AAA | Authentication Authorization Accounting |
| AKA | Authentication and Key Agreement |
| APN | Access Point Name |
| AVP | Attribute Value Pair |
| CK | Ciphering Key |
| DEA | Diameter EAP Answer |
| DER | Diameter EAP Request |
| EAP | Extensible Authentication Protocol |
| EPC | Evolved Packet Core |
| ePDG | Evolved Packet Data Gateway |
| EPS | Evolved Packet System |
| E-UTRAN | Evolved Universal Terrestrial Radio Access Network |
| HPLMN | Home Public Land Mobile Network |
| HSS | Home Subscriber Server |
| IK | Integrity Key |
| IMSI | International Mobile Subscriber Identity |
| IMEI | International Mobile Equipment Identity |
| IMS | IP Multimedia Subsystem |
| LTE | Long Term Evolution |
| MCM | Multi-Connection Mode |
| MK | Master Key |
| MSK | Master Session Key |
| NAI | Network Access Identifier |
| PDN | Packet Data Network |
| PDN GW | PDN Gateway |
| PLMN | Public Land Mobile Network |
| PRF | Pseudo Random Function |
| SCM | Single-Connection Mode |
| SIM | Subscriber Identity Module |
| TSCM | Transparent Single-Connection Mode |

Abbreviations

| | |
|---|---|
| TWAN | Trusted WLAN Access Network |
| UWAN | Untrusted WLAN Access Network |
| UE | User Equipment |
| USIM | Universal Subscriber Identity Module |
| WLAN | Wireless Local Area Network |
| WLCP | WLAN Control Protocol |

TECHNICAL BACKGROUND

3GPP TS 33.402 § 6.1 mandates as a general rule: "Access authentication for non-3GPP access in EPS shall be based on EAP-AKA (RFC 4187 [7]) or on EAP-AKA' (RFC 5448 [23])"

As defined in 3GPP TS 23.402 § 16.2, to access to a TWAN, the UE shall first authenticate using EAP ("The EAP authentication procedure is initiated and performed involving the UE, the TWAN and the 3GPP AAA Server").

As defined in 3GPP TS 33.402 § 8.2 "Mechanisms for the set up of UE-initiated IPsec tunnels", "EAP-AKA, as specified in RFC 4187 [7], within IKEv2, as specified in RFC 5996 [30], shall be used to authenticate UEs"

3GPP TS 29.273 does currently not support Authentication and Authorization procedures for un-authenticated UEs over the AAA interfaces.

DESCRIPTION OF VARIOUS ASPECTS AND/OR EMBODIMENTS OF THE INVENTION

In some countries, Mobile networks (called PLMN) need, due to local regulation, to support emergency sessions for Unauthenticated UE (e.g. for mobile phones—UE—that do not contain a USIM). This feature implies that both the network access layer and the service layer support unauthenticated UE issuing emergency sessions.

3GPP has already provided this capability for:

The CS (Circuit Switched) domain so for both the access and service layers. This is defined e.g. in 3GPP TS 24.008

The IMS domain so for the service layer of session set-up relying on IP. This is defined in 3GPP TS 23.167

The EUTRAN (LTE) access so for the 3GPP access layer of session set-up relying on IP. This is defined in 3GPP TS 23.401

Support of emergency sessions over WLAN for Unauthenticated UE is lacking in 3GPP specification. This support should be provided in both cases of Trusted access (TWAN) and Untrusted access (UWAN) to EPC (Evolved Packet Core) defined in 3GPP TS 23.402.

Various aspects and/or embodiments of the invention allowing such support will be described hereafter.

In some embodiments, for an UE that needs to set-up an EPC access over WLAN in order to issue an emergency session, when it receives from the authenticator a request to provide its identity (as part of an EAP-Identity request), Even though the UE has got no credential to access to the EPC (the UE has got no USIM), the UE sends a specific identity that supports the NAI format and that is built based on its IMEI (International Mobile Station Equipment Identity as defined in 3GPP TS 23.003) and on a specific realm dedicated to the support of emergency services within 3GPP networks.

When the UE has got credentials (USIM) but knows it can't get authenticated, the UE sends a specific identity that supports the NAI format and that is built based on its IMSI and on a specific realm dedicated to the support of emergency services within 3GPP networks.

In some embodiments, this access request is routed, based on the realm of the NAI, to a specific 3GPP AAA server function that always grants access but provides specific authorization data that allow network access only for emergency services.

In some operational cases, where the UE should normally get authenticated, but where a 3GPP AAA proxy discovers some network issue preventing the proper authentication of an UE issuing an emergency request, the 3GPP AAA proxy may (based on local policies) divert the AAA signaling related with the authentication/authorization of the UE towards the same specific 3GPP AAA server function. This requires that a specific indication is sent back by the specific 3GPP AAA server to the UE telling that the access cannot be regularly authenticated (e.g. no regular EAP-AKA/EAP-AKA' authentication can take place).

In some embodiments, apart from exceptions related with authentication and MSK determination the EAP-AKA/EAP-AKA' and AAA procedures take place as in the case of a regularly authenticated UE. The EAP procedure provides the UE and the network with a MSK (Master Session Key) to be used for security on the radio interface. The MSK is determined based on a different formula than in case the UE is actually authenticated.

Benefits of embodiments of the invention include:

It reuses for the access to emergency services the principles (and exchange of information between the UE and the network especially in case of TWAN access (*)) of the access a regular UE: usage of an EAP procedure, UE authorization to access to the EPC network granted by a 3GPP AAA server that furthermore provides security material (*) For example a specific EAP procedure for access to emergency services without authentication is run to allow the UE and the network to exchange parameters they exchange via EAP-AKA' in case of a regular authentication It does not require support by the HPLMN in case of roaming In some embodiments, when the UE needs to issue an emergency service and does not have credentials to access to the network (e.g. the UE has got no (U)SIM), the UE sends as an answer to an EAP-Identity request from the authenticator (*), a specific identity that has part or all of following properties:

supports the NAI format: The identity shall take the form of a NAI, and shall have the form username@realm as specified in clause 2.1 of IETF RFC 4282 has the IMEI in the username part of the NAI has in the realm part of the NAI a specific value indicating the support of unauthenticated emergency services for 3GPP terminals. This realm part, (part of embodiments of the invention), is to be defined by standards e.g. by 3GPP.

(*) The authenticator is the entity that controls the UE access to the network based on authorization information coming from the (3GPP) AAA server. In TWAN (trusted WLAN access to EPC) case, the authenticator is in the TWAN, while in UWAN case (Untrusted WLAN access to EPC) it is the ePDG.

In some embodiments, the authenticator then tries to contact the AAA server that is responsible of the realm part of the NAI. In some embodiments, when this realm part is dedicated to the support of emergency service, the authenticator contacts a dedicated AAA server. This dedicated AAA server shall be located in the same country as the authenticator. No AAA server entity in the "HPLMN" can be contacted as the UE has got no USIM and thus the local network cannot determine a HPLMN for the UE.

In some embodiments, part or all of following steps may be provided in Trusted WLAN access case
- a specific EAP procedure for access to emergency services without authentication is run to allow the UE and the network to exchange parameters they exchange via EAP-AKA' in case of a regular authentication (e.g. request from the UE for an IP version in SCM; TWAN control plane address in MCM). This procedure reuses EAP-AKA' but modifies it as there is no mutual authentication between the UE and the network. It nevertheless reuses all the mechanisms defined so far in EAP-AKA' to negotiate between the UE and the network the TWAN mode (SCM/MCM) as well as to negotiate the parameters of the PDN connection in SCM
- in both Single-Connection Mode (SCM) and Multiple-Connection Mode (MCM), the UE also includes a new Emergency-Indication information to indicate to the AAA Server the establishment of an emergency PDN connection in the EAP-AKA' (this indication is already mentioned in 3GPP TR 23.771 for the case of a regular authentication but its inclusion as part of EAP-AKA' is part of embodiments of the invention). For a trusted WLAN access in Multiple-Connection Mode (MCM), the UE also includes a new Emergency Indication (already mentioned in 3GPP TR 23.771) as part of the WLCP PDN connection request following the attachment to the network.

In some embodiments, when local regulation allows unauthenticated emergency sessions, the AAA server serving the dedicated realm for emergency services always accepts the access request (no security material such as authentication vectors is retrieved from HSS, no subscription data is downloaded from the HSS) and provides authorization data allowing the UE to proceed with the emergency session but that forbid any other services: the AAA server bypasses usual authorization checks (e.g. against subscribed APNs, against locations where the UE may request a non 3GPP access to EPC, against whether the user has a non-3GPP access subscription, etc) For a trusted WLAN access, the AAA Server includes over STa a new Emergency-Indication AVP (already mentioned in 3GPP TR 23.771) to the TWAN to indicate to the TWAN that this is an emergency Attach, and thus that (already mentioned in 3GPP TR 23.771):
- In SCM the TWAG shall establish a PDN connection for emergency services
- In MCM the TWAG shall only accept WLCP requests from the UE for a PDN connection for emergency services.
- In both cases (SCM/MCM) the TWAG uses its locally configured Emergency Configuration Data (instead of using the connectivity parameters provided by the UE) to determine the parameters of the PDN connection to establish.

In some embodiments, as the dedicated AAA server is located in the same country as the authenticator, in roaming case only entities of the local country are involved to support emergency services for unauthenticated UE. This allows a roamer from a country where emergency sessions for unauthenticated UE is not allowed or not deployed to issue an un-authenticated emergency session in a country where this is allowed.

As an implementation option, this dedicated AAA server may be co-located with the authenticator (ePDG) or in a AAA proxy contacted by the authenticator (TWAP).

In some embodiments of the invention the usage of existing procedures for Trusted/Untrusted access to EPC over WLAN is allowed at UE, TWAN and ePDG level, namely
- the usage of EAP, i.e. the procedures to initiate the UE access to the network and for the network to tell the UE that it may proceed with the network access for unauthenticated emergency services. When, such access is not allowed, the local AAA entities should reject the EAP request; reusing EAP is essential to support emergency PDN connections for unauthenticated UEs over a trusted WLAN access (in SCM and MCM) since EAP is used to transfer parameters from the UE to the TWAN in SCM and EAP is used to convey TWAN parameters (e.g. TWAN control plane IPv4 or IPv6 address) to the UE in MCM.
- The usage of a AAA server that controls the UE access to the network (for both trusted and untrusted WLAN accesses).

In some embodiments, when EAP is used, (as part of existing procedures to access EPC over WLAN), the authenticator (TWAN/EPDG) and the UE expect the EAP procedure to output a MSK (Master Session Key) to be used for security on the radio interface (this MSK is computed at the 3GPP AAA server and in the UE). In some embodiments, similar principles are reused:
- In Trusted WLAN access case, the UE and the 3GPP AAA server locally determine a MSK based on a Key derivation function using the user part of the NAI as input; the difference with MSK determination for regular 3GPP access (per IETF RFC 5448) is that the ciphering keys CK/IK output of the AKA based authentication process cannot be used as there is no authentication in case of un-authenticated access to EPC. This MSK is passed from 3GPP AAA server to the TWAP and then to the WLAN AN and allows the usage of an un-modified WLAN AN
- In IETF RFC 5448 the key derivation is done as follows: "MK is derived and used as follows:
  MK=PRF'(IK'|CK',"EAP-AKA'"|Identity)
  (PRF=pseudo-random function defined in RFC 5448)
  K_encr=MK[0 . . . 127],
  K_aut=MK[128 . . . 383],
  K_re=MK[384 . . . 639],
  MSK=MK[640 . . . 1151]"
- In some embodiments MK is derived and used as follows:
  MK=PRF'("EAP-AKA'"|Identity) with Identity based on what the UE has provided over EAP: IMEI (SIMless access) or IMSI (UE with SIM but no possibility to authenticate it)
  K_encr, K_aut, K_re and MSK are determined based on MK as described in IETF RFC 5448

In some embodiments, same mechanisms as described above apply, when allowed in the local country of the authenticator, to support the case where the UE has got an USIM but can't get authenticated (the local network does not have a AAA relationship (direct or indirect) with the HPLMN of the UE and thus cannot proceed with the authentication of the UE).

In this case the UE creates a NAI with a specific realm but provides an IMSI (and not an IMEI) in the user name part of the NAI provided as answer of an EAP-Identity initiated by the authenticator.

This corresponds to an UE with an USIM that needs to set-up an emergency session but does not find any suitable WLAN network allowing it to get authenticated by its HPLMN.

The rest of the procedure is the same than the procedure for a SIMless UE apart than the IMSI is used as a User identifier instead of the IMEI (e.g. the IMSI is used instead of the IMEI to derive the MK and thus the MSK). In this case the UE knows in advance that it can't get authenticated so that the MSK is not determined based on the output of an EAP-AKA' authentication In some embodiments, in the case a AAA proxy (e.g. the 3GPP AAA proxy in case of roaming) detects it is impossible to contact a 3GPP AAA server in HPLMN and the access attempt is associated with an emergency situation, based on local policies it may redirect the access request (EAP-AKA signaling) to a local AAA server that serves the same realm than the one used to support unauthenticated emergency services for 3GPP terminals.

This may be e.g. because the regular 3GPP servers are out of service, congested or out of reach.

The local policies depend whether the local regulations accept un-authenticated emergency sessions In that case the same procedure applies: the UE is not actually authenticated and the MSK is determined based on a pseudo-random function that takes into account a fixed sequence of characters and the user Identity (IMSI) but NOT the ciphering keys CK/IK output of the AKA based authentication process; furthermore, the UE shall not try to authenticate the network in that case.

In some embodiments, as the UE cannot know in advance that no authentication will take place for its EPC access for emergency services, the network indicates that this is an access for limited service with no authentication in EAP-AKA' signaling sent to the UE and in AAA signaling sent to the authenticator.

To make the procedure more robust and more general this indication may also be provided to the UE (and the authenticator) in the two other cases described above SIMless access for emergency services (UE providing its IMEI as an identity)

The UE provides its IMSI (the UE has a SIM) but knows that it can't get authenticated.

An example of call flow for TWAN Authentication and Authorization Procedure for SCM—Unauthenticated emergency session is illustrated in FIG. 2.

Following steps may be provided, where the differences with the call flow of Annex A.2-1 of 3GPP TS 29.273 have been underlined in the description below.

1. A connection is established between the UE and the TWAN, using a specific procedure based on IEEE 802.11 [40].
2. The TWAN sends an EAP Request/Identity to the UE.
3. The UE sends an EAP Response/Identity message to the TWAN containing the IMEI in the user part (SIM less UE) (or the IMSI in case of UE that can't get authenticated) and the specific domain for unauthenticated access for emergency services.
4. The TWAN forwards the EAP payload received from the UE to the 3GPP AAA Server (serving the specific domain for unauthenticated access for emergency services) and also indicates the supported TWAN connection modes in the DER message.
5. Void
6. The 3GPP AAA Server sends an EAP Request/AKA'-Challenge in which it indicates to the UE the TWAN connection modes supported by the network (e.g. TSCM, SCM and MCM) and that this is an access for limited service with no authentication. The Result-Code AVP in the DEA message is set to DIAMETER_MULTI_ROUND_AUTH. The TWAN-S2a-Connectivity Indicator is not set in the DEA-Flags AVP. The DEA message contains also an indication that this is an access for limited service with no authentication
7. The TWAN forwards the EAP payload to the UE. The UE shall not try to authenticate the network
8. The UE sends the EAP Response/AKA'-Challenge in which it indicates the requested connection mode. If the UE requests SCM, the UE also indicates the requested parameters for the session: indicator of an emergency service, the PDN Type (no APN is provided in that case), the PDN type (IPv4 or IPv6), Initial Attach/Handover indication and/or PCO.
9. The TWAN forwards the EAP payload to 3GPP AAA Server.
10. Void.
11. In this case (emergency) the 3GPP AAA Server shall accept any challenge response the UE may have sent and authorize the mode requested by the UE (here SCM). The 3GPP AAA Server includes the UE requested parameters for the session: indicator of an emergency service, PDN type, Initial Attach/Handover indication and/or PCO in the DEA message with the Result-Code AVP set to DIAMETER_MULTI_ROUND_AUTH. The 3GPP AAA Server also sets the TWAN-S2a-Connectivity Indicator in the DEA-Flags AVP to request the TWAN to proceed with the establishment of the S2a connectivity.
12. The TWAN sends a Create Session Request/PBU message to the PDN GW to initiate the S2a tunnel establishment. The TWAG provides the IMEI as UE identity (SIM less UE) (or the IMSI in case of UE that can't get authenticated). [Providing the IMEI over the GTP-c interface to the PGW is used in case of emergency calls set-up over 3GPP access for SIMless UE]
13. The PDN GW informs (S6b Authorization Request) the 3GPP AAA Server of its PDN GW identity and the APN corresponding to the UE's PDN Connection and of the Permanent User Identity (NAI with the IMEI in the User part when the PGW has not received the IMSI from the ePDG/TWAG). The AAA Server authorizes the request for an emergency PDN connection without any further check. The 3GPP AAA Server does not update the HSS with the PGW address.
14. The PDN GW returns a Create Session Response/PBA message to the TWAN, including the IP address(es) allocated for the UE.
15. The TWAN includes the provided Connectivity Parameters received from the PDN GW and sets the TWAN-S2a-Connectivity Indicator in the DER-Flags AVP in the DER message to the 3GPP AAA Server. The 3GPP AAA Server ignores the EAP payload included in the DER message.
16. The 3GPP AAA Server includes the PDN connectivity parameters in the AKA'-Notification and sends the DEA message to the TWAN. The Result-Code AVP in the DEA message is set to DIAMETER_MULTI_ROUND_AUTH. The TWAN-S2a-Connectivity Indicator is not set in the DEA-Flags AVP.
17. The TWAN forwards the EAP payload to the UE.

18-19. The UE responds with an EAP-RSP/AKA'-Notification message that the TWAN forwards to the 3GPP AAA Server.
20-21. The 3GPP AAA Server sends an EAP Success message that the TWAN forwards to the UE. The Result-Code AVP in the DEA message is set to DIAMETER_SUCESS.

In some embodiments, considering the TWAN access to EPC as an example, the AAA server may (this is just an illustrative example) in the case of an un-authenticated UE (e.g. SIMless UE) provide following information to the TWAN in the Authentication and Authorization Answer message (see 3GPP TS 29.273):

| Information element name | Mapping to Diameter AVP | Cat. | Description |
|---|---|---|---|
| User Identity | User-Name | M | The User Id coded as a NAI with the IMEI in the User part (as part of the invention). No fast RE-authentication/Pseudonym is used in case of Un-authenticated emergency session. In case the UE has provided an IMSI but this IMSI has not been authenticated, the IMSI is provided as User Identity |
| EAP payload | EAP payload | O | EAP payload containing EAP success. |
| Authentication Request Type | Auth-Request-Type | M | It shall contain the value AUTHORIZE_AUTHENTICATE. See IETF RFC 4072 [5]. |
| Result code | Result-Code/ Experimental Result Code | M | |
| Session Alive Time | Session-Timeout | O | This AVP may be present if the Result-Code AVP is set to DIAMETER_SUCCESS; if present, it contains the maximum number of seconds the session is allowed to remain active. Nothing specific to support un-authenticated UE apart from the fact that the 3GPP AAA server may use a specific Session-Timeout value in that case |
| Accounting Interim Interval | Accounting Interim-Interval | O | In case of Un-authenticated emergency session this information is not provided. |
| Pairwise Master Key | EAP-Master-Session-Key | C | This IE shall be present if Result-Code AVP is set to DIAMETER_SUCCESS. |
| Default APN | Context-Identifier | C | This information is not sent by the AAA server as the TWAN uses the local Emergency Configuration Data |
| APN-OI replacement | APN-OI-Replacement | C | This information is not sent by the AAA server as the TWAN uses the local Emergency Configuration Data |
| APN and PGW Data | APN-Configuration | C | This information shall not be provided as the UE is only allowed to set up an emergency PDN connection for emergency services |
| Serving GW Address | MIP6-Agent-Info | O | Not applicable. |
| Mobility Capabilities | MIP6-Feature-Vector | C | This information shall not be provided as the UE is only allowed to set up an emergency PDN connection for emergency services |
| Permanent User Identity | Mobile-Node-Identifier | C | Same as User Identity without any leading digit |
| 3GPP AAA Server URI | Redirect-Host | C | This information is not sent for an unauthenticated emergency PDN connection since the AAA does not query the HSS for such a user (and thus cannot be notified by the HSS if this user is already served by a different AAA Server). |
| UE Charging Data | 3GPP-Charging-Characteristics | O | This information is not sent by the AAA server as the TWAN uses the local Emergency Configuration Data |
| UE AMBR | AMBR | C | This information is not sent by the AAA server as the TWAN uses the local Emergency Configuration Data |
| Trust Relationship Indicator | AN-Trusted | C | As in case of a regular STa session |
| Supported Features (See 3GPP TS 29.229 [24]) | Supported-Features | O | If present, this information element shall contain the list of features supported by the origin host for the lifetime of the Diameter session. |
| FA-RK | MIP-FA-RK | C | This AVP is not used in case of WLAN access. |
| FA-RK-SPI | MIP-FA-RK-SPI | C | This AVP is not used in case of WLAN access |
| Trace information | Trace-Info | C | This information element is not supported for unauthenticated emergency sessions |
| MSISDN | Subscription-ID | C | Not applicable |
| DEA Flags | DEA-Flags | O | This Information Element contains a bit mask. As part of this invention the 3GPP AAA server can indicate whether the IMSI has been authenticated ("Unauthenticated IMSI" flag over STa). The TWAN uses this information to populate the "Unauthenticated IMSI" information over S2a/GTP-c which is currently defined as follows: Unauthenticated IMSI: This flag shall be set to 1 on the S4/S11 and S5/S8 interfaces if the IMSI present in the message is not authenticated and is for an emergency attached UE. |
| Selected TWAN Connection Mode | TWAN-Connection-Mode | C | This information is the same than in case of a regular TWAN session (i.e. a TWAN session associated with EAP-AKA' authentication) |

-continued

| Information element name | Mapping to Diameter AVP | Cat. | Description |
| --- | --- | --- | --- |
| Requested Connectivity Parameters | TWAN-Connectivity-Parameters | C | This information is the same than in case of a regular TWAN session (i.e. a TWAN session associated with EAP-AKA' authentication). |
| WLCP Key | WLCP-Key | C | This IE should be present if the Result-Code AVP is set to DIAMETER_SUCCESS and the selected TWAN Connection Mode is MCM. Using WLCP ciphering in case of un-authenticated emergency sessions allows having the same WLCP SW for both cases of authenticated and non-authenticated emergency sessions. Conversely the invention could work when 3GPP would decide not to use WLCP ciphering for un-authenticated emergency sessions. |

Various aspects of the invention include (though not being limited to) following aspects.

An aspect is a User Equipment UE, configured for support of emergency services over WLAN access to 3GPP Evolved Packet Core EPC for unauthenticated User Equipments.

Various embodiments may be provided, including (though not being limited to) following embodiments, which may be taken alone or in combination, according to various combinations.

In an embodiment, said User Equipment is configured to:
in response to a request to provide a user identity for access authentication, provide a specific Network Access Identity NAI-based user identity having a realm part indicating unauthenticated access for emergency services.

In an embodiment, said User Equipment is configured to:
provide said specific user identity in one of following cases:
the UE has no IMSI,
the UE has an IMSI but knows it cannot get authenticated.

In an embodiment, said User Equipment is configured to:
if the UE has no IMSI, provide a specific NAI-based user identity having a username part which is based on IMEI.

In an embodiment, said User Equipment is configured to:
perform a specific EAP-based procedure for access to EPC over WLAN for emergency services without authentication, said specific EAP-based procedure including, with respect to a regular EAP-based procedure, at least one of:
not trying to authenticate the network,
deriving a Master Key MK without use of Ciphering Key CK and Integrity Key IK.

Another aspect is an authenticator, such as TWAN entity for Trusted WLAN access to EPC or ePDG for Untrusted WLAN access to EPC, configured for support of emergency services over WLAN access to 3GPP Evolved Packet Core EPC for unauthenticated User Equipments.

Various embodiments may be provided, including (though not being limited to) following embodiments, which may be taken alone or in combination, according to various combinations.

In an embodiment, said authenticator is configured to:
route a message from a User Equipment UE, based on a realm part of a Network Access Identity NAI-based user identity indicating unauthenticated access for emergency services, towards a specific 3GPP AAA Server serving a domain dedicated to unauthenticated access for emergency services.

In an embodiment, said authenticator is configured to:
process an indication from the 3GPP AAA server that an access is for limited service
process an indication from the 3GPP AAA server that the user identity has not been authenticated and relay this information to the PDN GW Another aspect is an 3GPP AAA Server, configured for support of emergency services over WLAN access to 3GPP Evolved Packet Core EPC for unauthenticated User Equipments.

Various embodiments may be provided, including (though not being limited to) following embodiments, which may be taken alone or in combination, according to various combinations.

In an embodiment, said 3GPP AAA Server is configured to:
serve a domain dedicated to unauthenticated access for emergency services,
grant access to unauthenticated User Equipment UEs,
provide specific authorization data that allow network access for emergency services to said UEs.

In an embodiment, said 3GPP AAA Server is configured to:
perform a specific EAP-based procedure for access to emergency services without authentication, said specific EAP-based procedure including, with respect to a regular EAP-based procedure, at least one of:
not retrieving authentication vectors for the UE from the HSS,
providing an indication that the access is for limited service with no authentication,
accepting any challenge response sent by the UE,
not downloading the user's subscription information from the HSS,
accepting a request for an emergency PDN connection without any further check,
deriving a Master Key MK without use of Ciphering Key CK and Integrity Key IK,
while it supports some of the features of a regular 3GPP AAA server such as in case of a TWAN access the negotiation of the mode of the access or the relay of information between EAP based signalling and the authenticator In an embodiment, said 3GPP AAA Server is configured to:
signal to the UE and to the authenticator involved in said access authentication that said access is an access for limited service with no authentication.

In an embodiment, said 3GPP AAA Server is configured to:
  signal to the authenticator involved in said access authentication that the IMSI it provides in signalling towards the authenticator has not been authenticated.

Another aspect is an 3GPP AAA Proxy configured for support of emergency services over WLAN access to 3GPP Evolved Packet Core EPC for unauthenticated User Equipments.

Various embodiments may be provided, including (though not being limited to) following embodiment.

In an embodiment, said 3GPP AAA Proxy is configured to:
  upon detection that it is impossible to contact a 3GPP AAA server in HPLMN for an access authentication attempt associated with an emergency situation for a User Equipment, based on local policies redirect an access authentication request to a local AAA server serving a domain dedicated to unauthenticated access for emergency services.

Another aspect is a method for support of emergency services over WLAN access to 3GPP Evolved Packet Core EPC for unauthenticated User Equipments.

Various embodiments may be provided, including (though not being limited to) following embodiments, which may be taken alone or in combination, according to various combinations.

In an embodiment, said method comprises:
a specific 3GPP AAA Server serving a domain dedicated to unauthenticated access for emergency services, granting access to an unauthenticated User Equipment, and providing specific authorization data that allow network access for emergency services to said UE.

In an embodiment, said method comprises:
in response to a request to provide a user identity for access authentication, a User Equipment UE providing a specific NAI-based user identity having a realm part indicating unauthenticated access for emergency services.

In an embodiment, said method comprises:
an authenticator such as TWAN entity for Trusted WLAN access, or ePDG for Untrusted WLAN access, routing a message from said UE based on said realm part towards said specific 3GPP AAA Server.

In an embodiment, said method comprises:
upon detection that it is impossible to contact a 3GPP AAA server in HPLMN for an access authentication attempt associated with an emergency situation for a User Equipment, a 3GPP AAA Proxy, based on local policies, redirecting an access authentication request for said UE to a local AAA server serving a domain dedicated to unauthenticated access for emergency services.

In an embodiment, said method comprises:
a 3GPP AAA server indicating to the UE and to the authenticator that an access corresponds to an access to emergency services for un-authenticated device and is thus restricted to the support of emergency services.

Various other embodiments may be provided for said method, according to above-mentioned various embodiments for the User Equipment, the authenticator, the 3GPP AAA Server, the 3GPP AAA Proxy.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An apparatus comprising:
at least one processor; and
at least one memory including computer program code,
  the at least one memory and the computer program code configured to, with the at least one processor, cause the apparatus at least to
  perform a specific extensible authentication protocol-based procedure without mutual authentication between said apparatus and a packet core network, upon establishment of a connection between said apparatus and a trusted wireless local area network access network for access by said apparatus to emergency services over said trusted wireless local area network access network to said packet core network,
  within said procedure, receive a message comprising an indication that said access is for limited service, and an indication of connection modes for said access over said trusted wireless local area network access network, the connection modes including at least one of a single-connection mode or a multiple-connection mode,
  within said procedure, negotiate with said packet core network a connection mode of said connection modes for said access over said trusted wireless local area network access network, and
  within said procedure, derive a master session key for said access, without use of a ciphering key and an integrity key, but using an identity provided by the apparatus,
  wherein said connection mode comprises one of the single-connection mode and the multiple-connection mode, and
  wherein said trusted local area network access network is configured to interface to said packet core network via an interface to a packet data network gateway.

2. The apparatus according to claim 1, wherein, the at least one memory and the computer program code are further configured to, with the at least one processor, cause the apparatus at least to:
receive said indication that said access is for limited service with no authentication, in case an international mobile subscriber identity-based user identity cannot get authenticated by said packet core network.

3. The apparatus according to claim 1, wherein, the at least one memory and the computer program code are further configured to, with the at least one processor, cause the apparatus at least to:
within said procedure, receive said message from said packet core network.

4. The apparatus according to claim 1, wherein the apparatus comprises a user equipment.

5. The apparatus according to claim 1, wherein an identity provided by the apparatus comprises a network access identity (NAI)-based identity.

6. The apparatus according to claim 1, wherein said message further comprises a request for an international mobile subscriber identity of the apparatus.

7. The apparatus according to claim 1, wherein the message includes the indication that said access is for limited service, and the indication of connection modes for said access over said trusted wireless local area network access network is received by the apparatus in signaling.

8. The apparatus according to claim 1, wherein the packet core network is an evolved packet core network, and the interface is an S2a interface.

9. A method comprising:
performing a specific extensible authentication protocol-based procedure without mutual authentication between a user equipment and a packet core network, upon establishment of a connection between said user equipment and a trusted wireless local area network access network for access by said user equipment to emergency services over said trusted wireless local area network access network to said packet core network,
within said procedure, send a message comprising an indication that said access is for limited service, and an indication of connection modes for said access over said trusted wireless local area network access network, the connection modes including at least one of a single-connection mode or a multiple-connection mode,
within said procedure, negotiating with said packet core network a connection mode of said connection modes for said access over said trusted wireless local area network access network, and
within said procedure, deriving a master session key for said access, without use of a ciphering key and an integrity key, but using an identity provided by the user equipment,
wherein said connection mode comprises one of the single-connection mode and the multiple-connection mode, and
wherein said trusted wireless local area network access network is interfaced to said packet core network via an interface to a packet data network gateway.

10. The method according to claim 9,
wherein said indication that said access is for limited service with no authentication is received, in case an international mobile subscriber identity-based user identity cannot get authenticated by said packet core network.

11. The method according to claim 9,
wherein said message is received, within said procedure, from said packet core network.

12. The method according to claim 9, wherein the packet core network is an evolved packet core network, and the interface is an S2a interface.

13. An apparatus comprising:
at least one processor; and
at least one memory including computer program code,
the at least one memory and the computer program code configured to, with the at least one processor, cause the apparatus at least to
perform a specific extensible authentication protocol-based procedure without mutual authentication between said apparatus and a user equipment, upon establishment of a connection between said user equipment and a trusted wireless local area network access network for access by said user equipment to emergency services over said trusted wireless local area network access network to a packet core network,
within said procedure, send a message comprising an indication that said access is for limited service, and an indication of connection modes for said access over said trusted wireless local area network access network, the connection modes including at least one of a single-connection mode or a multiple-connection mode,
within said procedure, negotiate with said user equipment a connection mode of said connection modes for said access over said trusted wireless local area network access network, and
within said procedure, derive a master session key for said access, without use of a ciphering key and an integrity key, but using an identity provided by the user equipment,
wherein said connection mode comprises one of the single-connection mode and the multiple-connection mode, and
wherein said trusted wireless local area network access network is configured to interface to said packet core network via an interface to a packet data network gateway.

14. The apparatus according to claim 13, wherein, the at least one memory and the computer program code are further configured to, with the at least one processor, cause the apparatus at least to:
send said indication that said access is for limited service with no authentication, in case an international mobile subscriber identity-based user identity cannot get authenticated by said apparatus.

15. The apparatus according to claim 13, wherein, the at least one memory and the computer program code are further configured to, with the at least one processor, cause the apparatus at least to:
within said procedure, send said message towards said user equipment.

16. The apparatus according to claim 13, wherein the apparatus comprises a third generation partnership project (3GPP) authentication authorization accounting (AAA) server.

17. The apparatus according to claim 13, wherein the message includes the indication that said access is for limited service, and the indication of connection modes for said access over said trusted wireless local area network access network is sent by the apparatus in signaling.

18. The apparatus according to claim 13, wherein the packet core network is an evolved packet core network, and the interface is an S2a interface.

* * * * *